United States Patent [19]
Latter

[11] 3,963,401
[45] June 15, 1976

[54] INJECTION MOULDING MACHINE

[75] Inventor: Geoffrey Latter, Mississauga, Canada

[73] Assignee: A. C. Hamilton & Co., Mississauga, Canada

[22] Filed: June 5, 1975

[21] Appl. No.: 584,091

[52] U.S. Cl. .......................... 425/242 R; 425/451.5
[51] Int. Cl.² .......................................... B29F 1/00
[58] Field of Search....... 425/242 R, 244, DIG. 222, 425/DIG. 223, 450.1, 451.2, 451.6, 247, 251, 252

[56] References Cited
UNITED STATES PATENTS
3,086,244    4/1963    Hehl ................................. 425/244

*Primary Examiner*—J. Howard Flint, Jr.
*Attorney, Agent, or Firm*—Arne I. Fors

[57] ABSTRACT

An improved injection moulding machine comprising a fixed mould clamping assembly and injection assembly having novel support means for positively and accurately raising and lowering the injection assembly. Means are provided for vertically raising and lowering the injection assembly relative to the mould clamping assembly whereby the mould clamping assembly is maintained in parallel horizontal alignment with the injection assembly. The support means comprise a pair of vertical support rods adapted for vertical adjustment secured to a pair of parallel tie bars at substantially the center of gravity of the injection assembly and means for raising and lowering the vertical rods in unison for adjusting the height of the injection assembly. Connecting means are provided to secure the ends of the tie bars adjacent the mould clamping assembly.

3 Claims, 2 Drawing Figures

INJECTION MOULDING MACHINE

BACKGROUND OF THE INVENTION

This invention relates to injection moulding machines and, in particular, relates to an improved injection moulding machine having a fixed mould clamping assembly and a novel support mechanism permitting vertical parallel adjustment of an injection assembly relative to said mould clamping assembly.

Certain mould designs which do not permit centre line injection require split line injection through the top of the mould. This requires either an injection moulding machine specifically for vertical injection or a machine with facilities for conversion to vertical split line injection, a laborious and time consuming conversion. Vertical adjustment of the injection assembly, to permit injection near the top of the mould, not only obviates the need for top split line injection but also is desirable in that the centre portion of the mould need not be obstructed by the mould sprue and can be better utilized for mould cavity design. In addition, vertical adjustment of the injection assembly permits design of multi-cavity moulds with optimum arrangement of cavities.

Conventional injection moulding machines do not have means for simple vertical adjustment of the injection assembly relative to the mould clamping assembly for selective alignment of the injection assembly with the mould sprue.

STATEMENT OF INVENTION

The present invention is directed to an improved injection moulding machine having novel support means for positively and accurately raising and lowering the injection assembly. The injection moulding machine of the invention comprises,, in combination, a supporting frame, a mould clamping assembly having a fixed platen mounted on said frame, an injection assembly having an injector and an injection cylinder, support means for vertically raising and lowering said injection assembly relative to said mould clamping assembly whereby the mould clamping assembly is maintained in parallel horizontal alignment with the injection assembly, said support means comprising a pair of parallel spaced tie bars, a pair of spaced vertical slots formed in proximity to each side of said fixed platen adapted to receive one end of said pair of tie bars, means for securing said ends of the pair of tie bars within said slots, a cross head for supporting the said injector mounted for slidable travel on said tie bars, a pair of vertical support rods adapted for vertical adjustment on said support frame and having connecting means securing said tie bars to the upper ends of said support rods substantially at the centre of gravity of said injection assembly, and means for raising and lowering said vertical rods in unison for adjusting the height of said injection assembly supported thereby. It is a principal object of the invention, therefore, to provide an improved injection moulding machine having a novel support structure for vertical parallel adjustment of an injection assembly relative to a fixed horizontal mould clamping assembly for flexibility of mould design.

It is another object of the present invention to provide an injection moulding machine having a support structure which is simple in construction, positive in adjustment and substantially trouble-free in operation.

BRIEF DESCRIPTION OF THE DRAWINGS

The foregoing and other objects of the invention, and the manner in which they can be attained, will become apparent from the following detailed description of the drawings, in which.

Like reference characters refer to like parts throughout the description of the drawings.

DESCRIPTION OF THE PREFERRED EMBODIMENT

Figure 1:
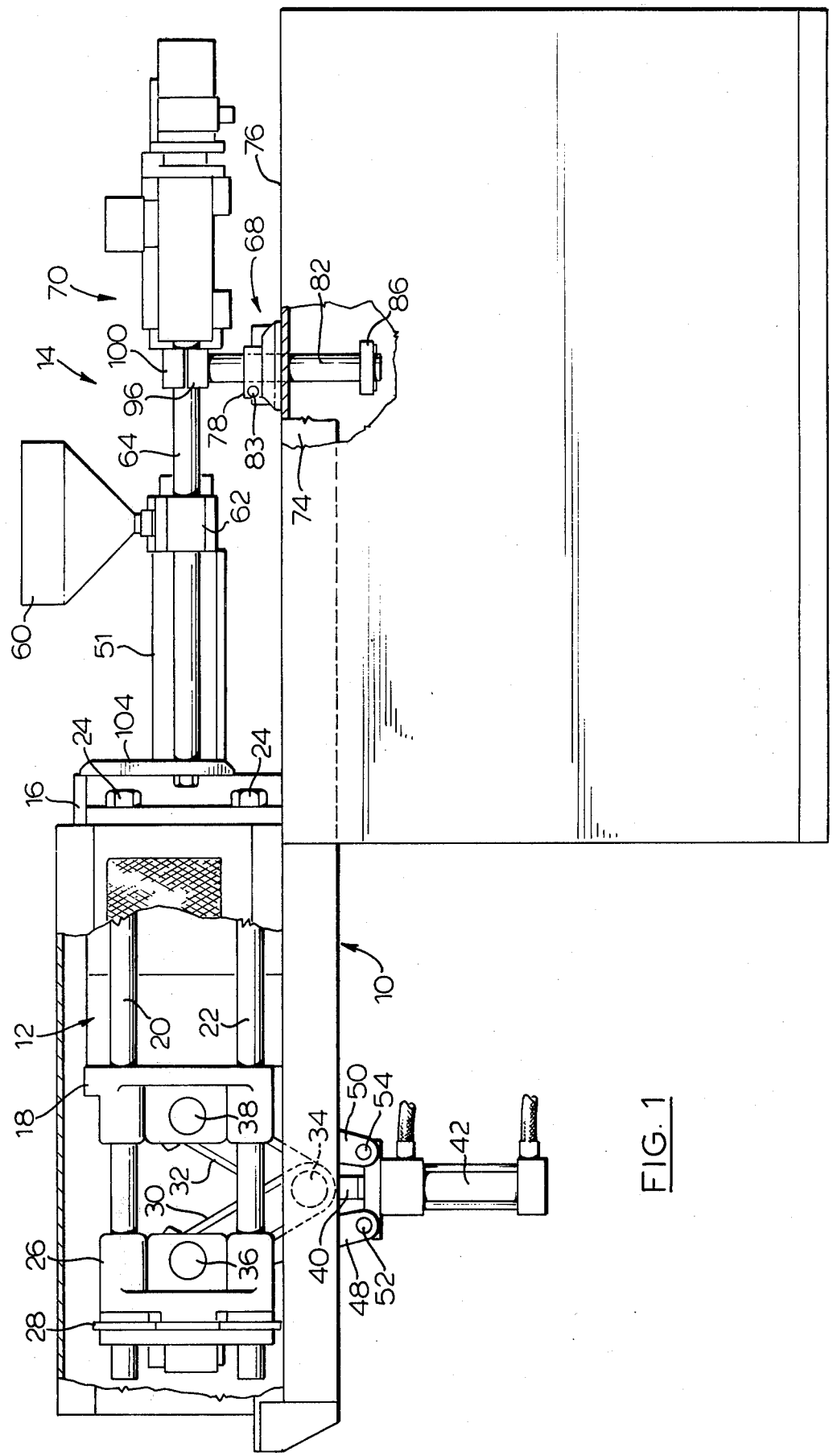
FIG. 1 is a side elevation, partly cut away, of the moulding machine with axial alignment of the injection assembly with the mould clamping assembly.

With reference to FIG. 1, there is shown a rigid machine frame having longitudinal beams 10 for supporting mould clamping assembly designated generally by numeral 12 and a cooperating injection assembly designated generally by numeral 14.

Mould clamping assembly 12 comprises opposed mould clamping platens for holding mould components in a closed position during moulding and in a spaced-apart open position for the ejection of moulded articles. The moulding platens consist of a fixed platen 16, a portion of which is shown, rigidly secured to beams 10 to the right in FIG. 1 and a moveable moulding platen 18 slidably mounted on a pair of parallel upper tie bars 20 and a pair of parallel lower tie bars 22 for reciprocal travel thereon. The opposed pairs of tie bars 20, 22 are rigidly secured a spaced distance apart at one end to fixed platen 16 by locking nuts 24 and at the other end to platen casting 26 by sprockets 28 journaled into platen casting 26 and threaded onto the ends of bars 20, 22. Sprockets 28 can be rotated for slidable adjustment of platen casting 26 on tie bars 20, 22 for reasons which will become apparent as the description proceeds.

Platen casting 26 is operatively connected to moveable platen 18 by a toggle mechanism consisting of pairs of links 30, 32 pivotally connected to each other at their inner ends by pin 34 (broken lines), which constitutes a toggle junction, and connected at their opposite ends to platen casting 26 and moveable platen 18 by pins 36, 38 respectively. Common pin 34 constituting the aforesaid toggle junction is secured to the free end of piston rod 40 which is adapted to reciprocate vertically from double-acting hydraulic cylinder 42 which is connected to and supported by platen casting 26 and moveable platen 18 by means of support arms 48, 50 through pivotal connections defined by connecting pins 36, 38, 52, and 54, as illustrated.

The extension of piston rod 40 from cylinder 42 causes links 30, 32 to assume an aligned position, not shown, with moveable platen 18 moved to a closed position to the right in FIG. 1 to close mould components between platens 16 and 18. It will be evident that the retraction of piston rod 40 into cylinder 42 will result in toggle junction 34 of links 30, 32 being depressed downwardly such that moveable platen 18 is guided to the left to its open position. Hydraulic cylinder 42 is of a double-acting type well known in the art, for positively extending and retracting piston rod 40.

Injection assembly 14 is of a known type consisting of a feed hopper or granule container 60 and an in-line screw injector 51 for charging molten thermoplastics under high pressure and temperature to a mould positioned in clamp assembly 12.

Figure 2:
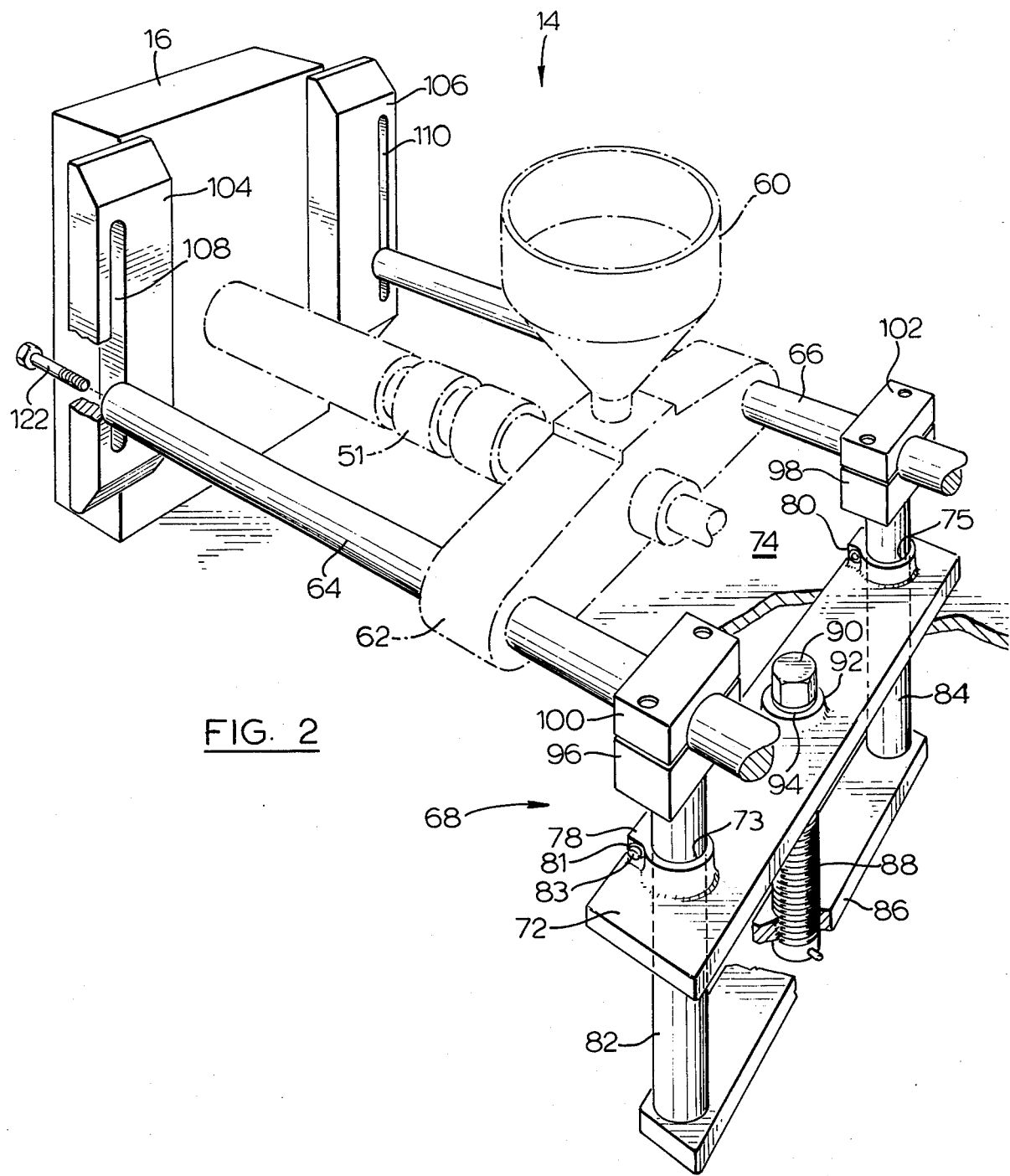
FIG. 2 is a perspective view, partly cut away, showing the novel support mechanism of the present invention.

With reference now also to FIG. 2, screw injector designated generally by numeral 51 and container 60 are supported by cross member 62 extending between and rigidly supported by spaced tie bars 64, 66. Tie bars 64, 66 are in turn supported by assembly 68 at substantially the centre of gravity of the injection assembly 14, including injection cylinders 70, whereby the injection assembly is balanced thereon.

Support assembly 68 comprises a support casting 72 seated transversely on upper longitudinal frame members 74 of enclosure 76. Casting 72 has a pair of spaced apertures 73, 75 to slidably receive support rods 82, 84 which can be locked in position by clamps 78, 80; each clamp comprising a locking insert 81 and bolt 83. The lower ends of rods 82, 84 are rigidly secured to a cross bar 86, by bolts not shown, which is vertically adjustable by threaded bolt 88 loosely journalled centrally in casting 72. Hexagonal head 90 of bolt 88, seated on shoulder 92 of aperture 94, permits rotation of bolt 88. Bolt 88 is threaded into the central portion of cross bar 86 such that said cross bar can be raised or lowered by rotation of said bolt for raising and lowering of vertical rods 82, 84 in unison.

The upper ends of rods 82, 84 support blocks 96, 98 which are grooved to receive tie bars 64, 66 for slidable adjustment therealong. Mating caps 100, 102 screwed onto blocks 96, 98 respectively lock tie bars 64, 66 in a desired longitudinal position.

The rearward ends of tie bars 64, 66 are connected to injection cylinders 70 and the forward end of said tie bars abut side plates 104, 106 rigidly secured to the face of platen 16. Each of said side plates 104, 106 has a longitudinal slot 108, 110 respectively formed therein adapted to receive a connector bolt 112 which is threaded axially into tie bars 64, 66, permitting securement of the tie bars to the side plates at any desired height within the range of adjustment of said slots 108, 110.

In operation, the injection assembly 14 is raised or lowered by rotation of hexagonal head 90 of threaded bolt 88 such that injector 51 is in desired alignment with the ingate of the mould secured between platens 16, 18. Rod clamps 78, 80 are tightened about support rods 82, 84 respectively to secure said rods in the desired vertical position and tie rods 64, 66 adjusted longitudinally for abutment against side plates 104, 106 such that bolts 112 can be tightened in recesses 108, 110 to lock the injection assembly in a horizontal position in parallel alignment with the mould assembly.

What I claim as new and desire to protect by Letters Patent of the United States is:

1. An improved injection moulding machine comprising, in combination, a supporting frame, a mould clamping assembly having a fixed platen mounted on said frame, an injection assembly having an injector and an injection cylinder, support means for vertically raising and lowering said injection assembly relative to said mould clamping assembly whereby the mould clamping assembly is maintained in parallel horizontal alignment with the injection assembly, said support means comprising a pair of parallel spaced tie bars, a pair of spaced vertical slots formed in proximity to each side of said fixed platen adapted to receive one end of said pair of tie bars, means for securing said ends of the pair of tie bars within said slots, a cross head for supporting the said injector mounted for slidable travel on said tie bars, a pair of vertical support rods adapted for vertical adjustment on said support frame and having connecting means securing said tie bars to the upper ends of said support rods substantially at the centre of gravity of said injection assembly, and means for raising and lowering said vertical rods in unison for adjusting the height of said injection assembly supported thereby.

2. An improved injection moulding machine as claimed in claim 1, in which said means for raising and lowering said vertical rods in unison comprises a casting seated on the supporting frame, said casting having a pair of spaced apertures adapted to slidably receive the support rods and clamps for locking said support rods in a desired vertical position.

3. An improved injection moulding machine as claimed in claim 2, in which a cross-bar is rigidly secured to the lower ends of said vertical rods and a threaded bolt journalled for rotation centrally in said casting is threaded into said cross-bar whereby rotation of said bolt raises said vertical rods in unison.

* * * * *